United States Patent [19]
Johnson et al.

[11] Patent Number: 5,400,070
[45] Date of Patent: Mar. 21, 1995

[54] LEVER ACTUATED OPTICAL OFFSET IMAGE SAMPLING SYSTEM

[75] Inventors: Dean A. Johnson, Churchville; Stephen P. Smith, Victor; William J. Mitchell, Rochester, all of N.Y.

[73] Assignee: Eastman Kodak Company, Rochester, N.Y.

[21] Appl. No.: 957,980

[22] Filed: Oct. 7, 1992

[51] Int. Cl.⁶ .......................................... H04N 5/225
[52] U.S. Cl. .................................. 348/219; 348/335
[58] Field of Search ................ 358/213.27, 213.28, 358/209, 41, 42; H04N 5/335, 5/225; 348/219, 266, 267, 268, 269, 270, 272, 222, 207

[56] References Cited

U.S. PATENT DOCUMENTS

| | | | |
|---|---|---|---|
| 634,560 | 10/1899 | Auguste et al. | |
| 1,760,198 | 5/1930 | Hough. | |
| 4,333,112 | 6/1982 | Matsumoto | 358/298 |
| 4,449,213 | 5/1984 | Noborimoto et al. | 369/45 |
| 4,517,603 | 5/1985 | Epsztein et al. | 358/213 |
| 4,543,601 | 9/1985 | Harada et al. | 358/213 |
| 4,581,649 | 4/1986 | Morokawa | 358/212 |
| 4,595,954 | 6/1986 | Endo et al. | 358/213 |
| 4,607,287 | 8/1986 | Endo et al. | 358/213 |
| 4,613,202 | 9/1986 | Kuriyama | 350/6.4 |
| 4,633,317 | 12/1986 | Uwira et al. | 358/213 |
| 4,638,371 | 1/1987 | Milch | 358/293 |
| 4,652,928 | 3/1987 | Endo et al. | 358/213 |
| 4,707,743 | 11/1987 | Tokumitsu et al. | 358/213.13 |
| 4,755,876 | 7/1988 | Dangler | 358/264 |
| 4,786,964 | 11/1988 | Plummer et al. | 358/44 |
| 4,910,413 | 3/1990 | Tamune | 250/578.1 |
| 4,920,418 | 4/1990 | Robinson | 358/213.28 |
| 4,922,333 | 5/1990 | Nutting et al. | 358/78 |
| 4,967,264 | 10/1990 | Parulski et al. | 358/44 |
| 5,063,450 | 11/1991 | Pritchard | 358/213.28 |
| 5,103,300 | 4/1992 | Nitta et al. | 358/41 |

FOREIGN PATENT DOCUMENTS

| | | | |
|---|---|---|---|
| 58-56581 | 4/1983 | Japan | H04N 5/30 |
| 58-162171 | 9/1983 | Japan | H04N 5/30 |
| 59-13476 | 1/1984 | Japan | H04N 5/335 |
| 59-15376 | 1/1984 | Japan | H04N 5/26 |
| 59-15377 | 1/1984 | Japan | H04N 5/26 |
| 59-15378 | 1/1984 | Japan | H04N 5/26 |
| 59-22485 | 2/1984 | Japan | H04N 5/30 |
| 60-223388 | 11/1985 | Japan | H04N 5/335 |
| 63-191483 | 8/1988 | Japan | H04N 5/335 |
| 63-240185 | 10/1988 | Japan | H04N 5/335 |
| 63-284979 | 11/1988 | Japan | H04N 5/335 |
| 62-308098 | 6/1989 | Japan | H04N 5/335 |
| WO90/05424 | 5/1990 | WIPO | H04N 5/46 |

OTHER PUBLICATIONS

Ser. No. 815,479, Apparatus for Mechanically Dithering a CCD Array; Inventor: Russell Palum; filed Dec. 31, 1991.

Patent application entitled CAM Actuated Optical Offset Image Sampling System; Inventors: Nicholas Sztanko, Stephen P. Smith, William B. Jones.

*Primary Examiner*—Michael T. Razavi
*Assistant Examiner*—Tuan V. Ho
*Attorney, Agent, or Firm*—David M. Wood

[57] ABSTRACT

The system of the present invention increases the resolution of an image that may be formed from an image sensor without increasing the resolution of the sensor. An image beam is directed along a path through a color filter wheel and a single non-rotating transparent plate and impinges on a CCD (Charge Coupled Device). The transparent plate is positioned in a frame by flexures. A lever, controlled by a cam, exert a force on the transparent plate causing the transparent plate to tilt about the optical axis. The cam surface directs the lever to tilt the transparent plate in a plurality of discrete sampling positions. At each sampling position, the tilted transparent plate displaces the image beam in a different direction which allows each pixel of the CCD to sample a plurality of areas of the image. The color wheel is rotated to sequentially place each filter into the path of the image beam. The CCD sequentially receives the light passed through the transparent plate and color filter wheel and converts the image formed by the light to corresponding electrical signals. The electrical signals are stored and reordered by interleaving to form an image with increased resolution.

9 Claims, 5 Drawing Sheets

LEVER ACTUATED OPTICAL OFFSET IMAGE SAMPLING SYSTEM

CROSS REFERENCE TO RELATED APPLICATION

The present application is related to the application titled, "Cam Actuated Optical Offset Image Sampling System" by Sztanko et al, filed this same date by same assignee.

FIELD OF THE INVENTION

The present invention relates to an optical imaging system for transforming a fixed image to an electrically storable image. More particularly, the invention relates to an optical sampling system with increased resolution.

BACKGROUND OF THE INVENTION

In a typical imaging system, an image beam is directed through a lens and onto an image sensor, for example a CCD (Charge Coupled Device), comprised of an array of sensing elements. These sensing elements, generally referred to as "picture elements" or "pixels", are arranged in rows and columns. As the array is scanned, the electrical output signal from each pixel is processed and used to produce a display, for example on a television monitor. Therefore, the resolution of such a display is a direct function of the number of pixels in the array of rows and columns. For example, an image sensor having 500 horizontal pixels per row will have a lower resolution than an image sensor which has 1,000 pixels per row. Increasing the number of pixels will increase the resolution. However, this will also increase the size of the image sensor. Therefore, other methods are sought to increase the resolution of an image without increasing the size of the image sensor.

One method is to scan the array multiple times while shifting the position of the image with respect to the image sensor between each scan. By shifting the image position, each pixel of the image sensor will capture information on several adjacent areas of the image. Thus, a low resolution array can be used to produce a high resolution image.

U.S. Pat. No. 4,920,418, "Imaging System Having a Swing-Driven Image Sensor" by Robinson discloses an apparatus for improving the resolution and reducing the optical alias of interlaced imaging systems which include a solid state image sensor. In one embodiment, the apparatus comprises a glass plate mounted on piezoelectric bimorphs. When a voltage is applied, the bimorphs tilt the glass plate between two positions corresponding to two fields such that the image passing through the glass plate is shifted relative to an image sensor. The images are scanned by the image sensor and the resulting signals are interlaced to form an image.

In U.S. Pat. No. 4,581,649, "Image Pickup System" by Morokawa, an image system is disclosed. The image system has an image sensor which includes a plurality of photodetectors arranged in two dimensions and an optical system having a lens for forming an image on the image sensor so that the image sensor produces picture data. A vibrator, comprising a pair of piezoelectric vibrator elements, is provided for vibrating the image on the image sensor so as to oscillate the picture data. A scanner is provided to be operative in synchronism with the vibration of the image for changing the oscillated picture data to data for a fixed image.

U.S. Pat. No. 4,755,876, "Image Scanner" by Dangler, discloses and image scanner which utilizes a dither plate to steer an image onto a sparsely-populated image sensor. Precisely controlled motors are used to properly position a pair of dither plates mounted for movement on orthogonal axes to provide "X" and "Y" scan directions.

U.S. Pat. No. 4,633,317, "Electro-Optical Detector System" by Uwira et al, discloses a high resolution electro-optical detector having a mosaic CCD. The CCD is configured as a sparse array of sensing elements separated by interstices. A mirror, suspended on gimbals, is electro-magnetically energized to periodically displace the image in a stepwise manner along a closed rectangular trajectory. The displacement allows the sensing elements to capture image information which would otherwise intersect the interstices. In further embodiments, the image is offset by rotating an optical component, such as an optical wedge or inclined optical plate.

U.S. Pat. No. 4,967,264, "Color Sequential Optical Offset Image Sampling System" by Parulski et al, discloses an image system incorporating multiple glass plates mounted at angles on a rotating filter wheel. The glass plates are positioned so as to displace a beam of light by a specific distance, each in a different direction. The image sensor's pixels sequentially receive the light passing through each of the filters and converts the image formed by the light to corresponding electrical signals. The electrical signals from each image are reordered by interleaving, to form an image with increased resolution.

The precisely controlled motors used by Dangler and the piezo-electric elements used by Robinson and Morokawa are expensive components which are not appropriate for a high quantity and/or low cost system. Furthermore, the high voltage requirements of the piezo-electric elements may not be desirable for consumer products. Size constraints indicate that the magnetically energized mirror of Uwira et al may not be suitable in compact devices. In addition, the apparatus of Uwira et al comprising a rotating optical component is susceptible to aberrations in the optics. Parulski et al's filter wheel requires uniformity of the multiple glass plates. Therefore, though each of these inventions have achieved a certain degree of success, a need continues to exist for an image displacement mechanism which is robust, compact in size, inexpensive and simple to manufacture, and is insensitive to glass aberrations.

SUMMARY OF THE INVENTION

The apparatus of the present invention increases the resolution of an image by utilizing a single, non-rotating transparent plate to displace an image beam to a plurality of discrete sampling positions.

According to the present invention, there is provided an imaging system comprising a light source directed along a path through an image so as to generate an image beam; an image sensor positioned in the path of the image beam having active and inactive areas; transparent means comprised of a single optical member interposed in the path of the image beam for controlling the placement of the image beam; and means for tilting the single optical member, without causing rotation, to displace the image beam through a plurality of discrete positions along a closed rectangular trajectory.

The apparatus comprises an image beam directed along a path through an optical lens system, a plate assembly, and a color filter wheel, and impinging on a CCD (Charge Coupled Device) image sensor. The CCD is formed from an array of photosensitive elements, generally referred to as "pixels", for generating signals indicative of the intensity of the image beam incident thereon. The color filter wheel is rotatably mounted perpendicular to the image beam. The plate assembly comprises a single, non-rotating transparent plate held in position in a frame by flexures. Levers are positioned such that the first end of the lever contacts the transparent plate. The second end of the lever contacts a cam surface of a cam body. When the cam body rotates, the changing height of the cam surface displaces the second end of the lever. As the second end of the lever is displaced, the first end of the lever is depressed against the transparent plate, causing the transparent plate to tilt. The variation of the cam surface allows the lever to tilt the transparent plate in a plurality of discrete sampling positions. At each sampling position, the tilted transparent plate displaces the beam of light through a substantially constant area of the transparent plate by a fraction of the distance between adjacent pixels forming the CCD. The CCD sequentially receives the light passed through the transparent plate and color filter wheel and converts the image formed by the light to corresponding electrical signals, the amplitude of which is proportional to the intensity of illumination occurring at each pixel. The electrical signals from each pixel are stored and reordered by interleaving to form an image with increased resolution.

Accordingly, the primary objective of the present invention is to provide an improved optical offset image sampling system.

Another object of the present invention is to increase the resolution of an image by capturing multiple signal values from each photosensitive element using optical offset sampling.

A further object of the present invention is to provide a compact offset image sampling system whereby the image beam passes through a substantially constant area of a single, non-rotating transparent plate thereby resulting in an apparatus less sensitive to material variations, dimensional variations, and aberrations in such a transparent plate.

The invention has the advantage of providing a simple system which does not require precise control, is inexpensive to manufacture, and is insensitive to vibrations.

These objects are given only be way of illustrative examples. Therefore, other desirable objectives and advantages inherently achieved by the disclosed invention may occur or become apparent to those skilled in the art.

BRIEF DESCRIPTION OF THE DRAWINGS

The foregoing and other objects, features, and advantages of the invention will be apparent from the following more particular description of the preferred embodiments of the invention, as illustrated in the accompanying drawings, wherein.

DETAILED DESCRIPTION OF THE PREFERRED EMBODIMENTS

Figure 1:
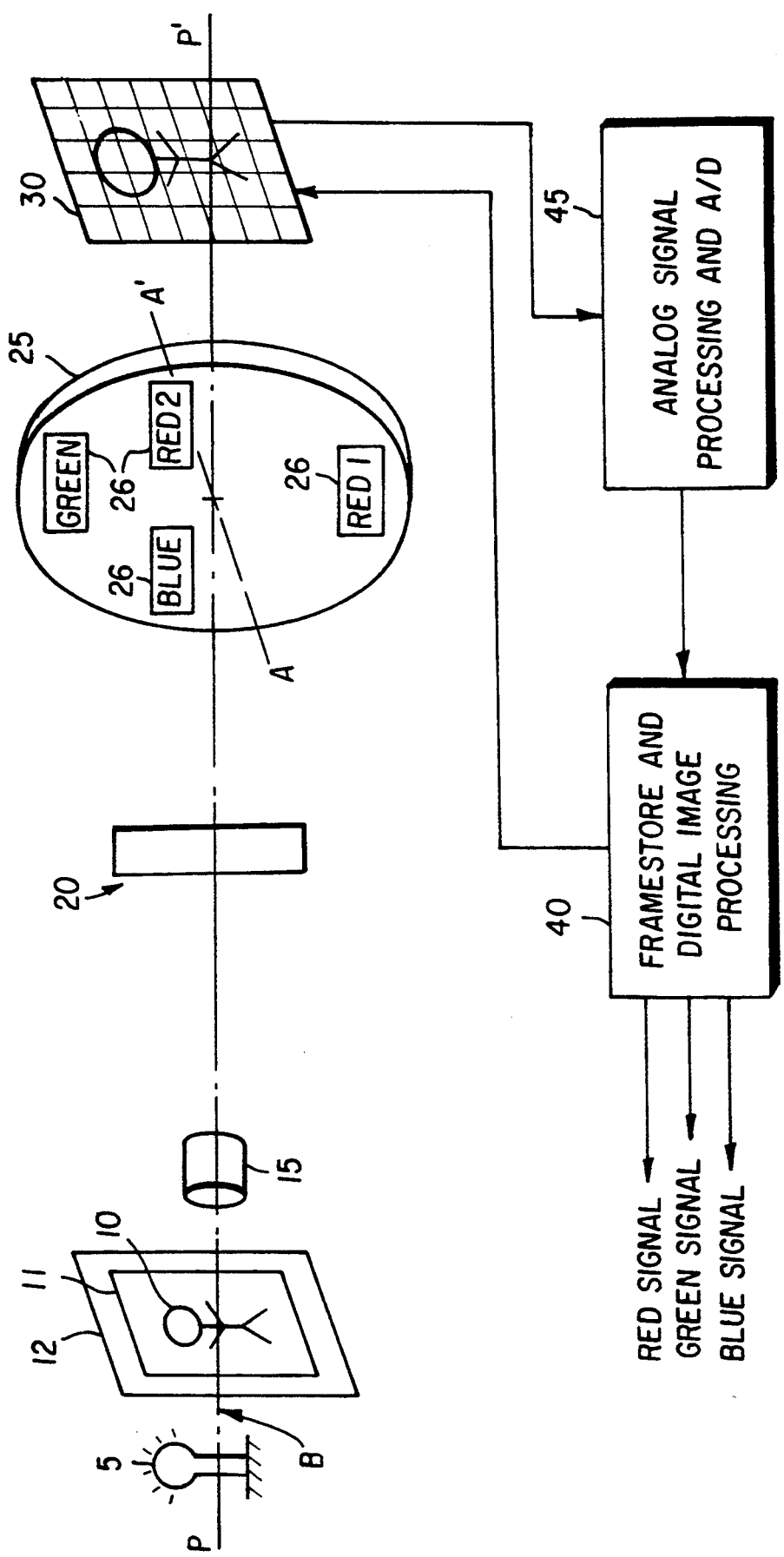
FIG. 1 is a diagram of the preferred embodiment of the present invention.

The following is a detailed description of the preferred embodiments of the invention, reference being made to the drawings in which the same reference numerals identify the same elements of structure in each of the several Figures.

FIG. 1 shows the preferred embodiment of the present invention. A fixed image 10 on an image support 11 is illuminated by a light source 5. An example of such an image support 11 would be a conventional photographic negative or slide. The image support 11 is positioned in a fixture 12. The resulting image beam B is directed along an optical axis P—P' through an optical lens system 15, a plate assembly 20, and a color filter wheel 25, and impinges on a CCD (Charge Coupled Device) image sensor 30. The frame store block 40 and the processing block 45 are used for processing the information captured by the CCD 30.

The optical lens system 15 focuses the image 10 on the image support 11 onto the CCD 30. The lens system 15 comprises a plurality of lens elements.

The color filter wheel 25 is rotatably mounted perpendicular to the image beam B and comprises a plurality of filters 26. In the preferred embodiment four filters 26, further identified as RED1, RED2, GREEN, and BLUE, comprise the color filter wheel 25. As described in U.S. Pat. No. 4,922,333 titled "Video Copying Apparatus Spectrally-Responsive to Slides or Negative" by Nutting et al, by providing two separate red filters in the filter wheel, the spectral pass bands of the red filters can be matched to the separate and distinctive red spectral responses of a photographic negative or slide. Though various shapes and sizes are possible, in the preferred embodiment the filters 26 are square in shape for ease of manufacture. The color filter wheel 25 rotates, by means not shown, about axis denoted A—A' which is positioned parallel to the optical axis P—P'. Axis A—A' is positioned such that the filters 26 intersect the optical axis P—P' when the color filter wheel 25 is rotated.

Figure 2:
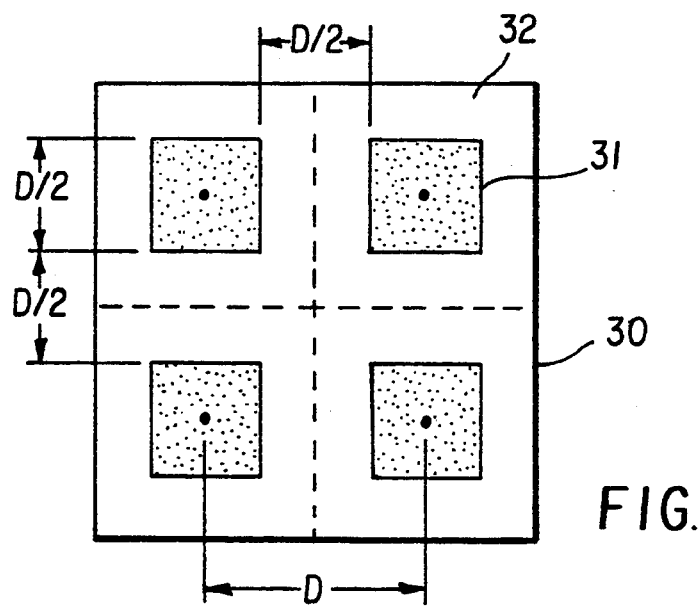
FIG. 2 illustrates one region of a CCD (Charge Coupled Device) shown in FIG. 1.

Positioned along the optical axis P—P' is the CCD 30, which is a monochrome image sensor. FIG. 2 illustrates one region of the CCD 30. Referring to FIG. 2, the CCD 30 comprises an array of sensing elements 31, also called "pixels", whose center-to-center distance is a value D. As shown in FIG. 2, in the preferred embodiment the pixels are square in shape, though other shapes are possible. The interstices 32 which exist between the pixels are inactive in image detection. In the preferred embodiment, the interstices 32 equally space the pixels 31 by a horizontal and vertical distance D/2. An example of such a CCD 30 is Kodak Model KAF-0400, an image sensor manufactured by the Eastman Kodak Company of Rochester, N.Y. Each pixel 31 provides an electrical output signal proportional to the intensity of the illumination at each pixel 31. Referring back to FIG. 1, the electrical output signals from the CCD 30 are directed as inputs to an analog signal processing and analog to digital (A/D) converter block 45. Within block 45 the signals from the CCD 30 are amplified, sampled, and converted to digital signals. The digital signals from the A/D converter portion of the block 45 are directed to a frame store and digital image processing block 40 which outputs a RED, GREEN, and BLUE signal on three separate channels. These signals may then be used to recreate the image on a color viewing screen or on a hard copy print.

Since the interstices 32 are inactive areas, only the pixels 31 can produce the electrical signals which form an image. Thus, to form an increased resolution image, the image 10 on the image support 11 can be moved relative to the CCD 30 to allow each pixel 31 to scan several adjacent areas of the image support 11. Such is the purpose of the plate assembly 20; that is, the plate assembly 20 displaces the image beam B with respect to the optical axis P—P'. Thus, the image 10 is shifted relative to the CCD 30. By displacing the image beam B, the slightly different positions of the image 10 can be scanned by the pixels 31 of the CCD 30.

Figure 3:
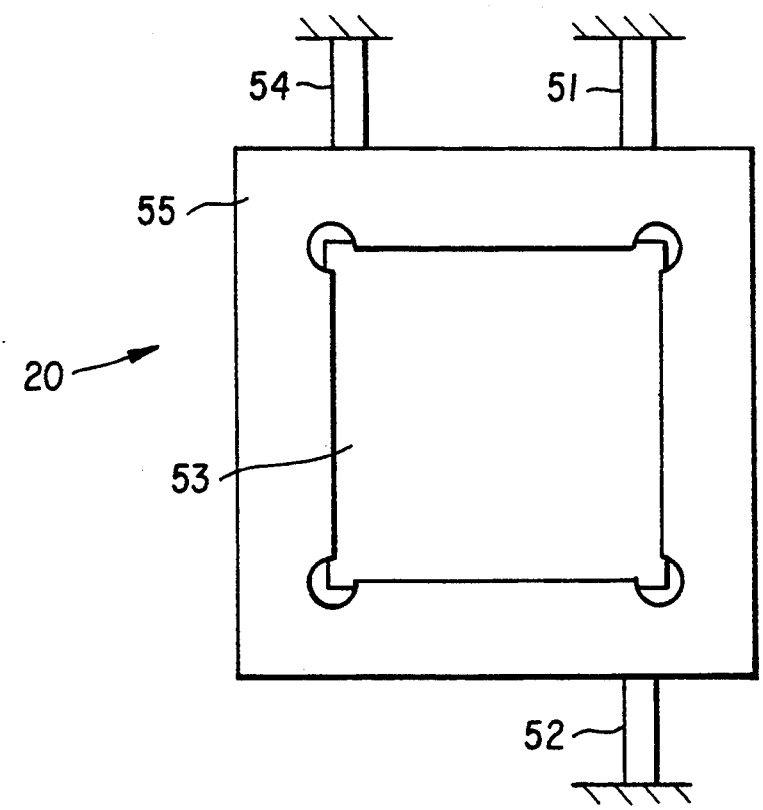
FIG. 3 shows a top view of the plate assembly shown in FIG. 1.

Referring now to FIG. 3, the plate assembly 20 comprises a frame 55, a transparent plate 53, and three springs 51, 52, 54. The three springs 51, 52, 54 are used to position the transparent plate 53 in the frame 55. The frame 55 is made of a rigid material. The center region of the frame 55 is removed to mount the transparent plate 53 and to allow the image beam B to be directed along the optical axis P—P'. In addition, material is removed from the frame 55 directly adjacent to the four corners of the transparent plate 53 so that the corners are not shattered during operation. In the preferred embodiment, the three springs 51, 52, 54 are flexures as shown in FIG. 3. The three springs 51, 52, 54 are securely mounted individually at three corners of the frame 55, positioning the transparent plate 53 against the frame 55 and preloading the corners of the transparent plate 53. As shown in FIG. 3, the springs 51, 52, 54 are individual components which are separate from the frame 55. If trying to reduce the number of parts in the system, alternate designs might be to form the springs 51, 52, 54 together into one component or incorporate the springs 51, 52, 54 into the frame 55. At this initial reference position, the transparent plate 53 is in a horizontal position which is parallel to the frame 55. When positioned in the frame 55, the transparent plate 53 is centered about the optical axis P—P'. In the preferred embodiment, this transparent plate 53 is made of optical glass, is square in shape, and has two parallel optical surfaces. Alternatively, the transparent plate 53 could be made of plastic. However, such a material would be more susceptible to scratches and the adhesion of particles, for example, dust or dirt. As a result, glass is the preferred material for the transparent plate 53.

Figure 4:
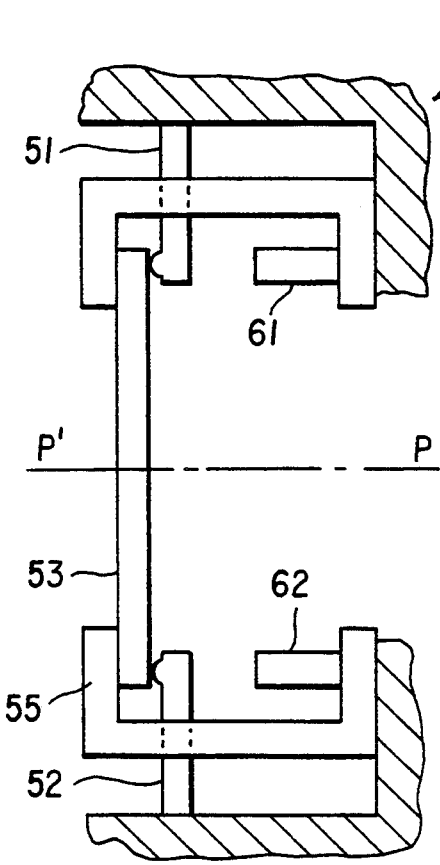
FIG. 4 shows a side view of the plate assembly shown in FIG. 1.

FIG. 4 is a side view of the plate assembly 20. This view shows the positioning of the transparent plate 53 about the optical axis P—P' in the frame 55. As shown in this view, the springs 51, 52, 54 have a dimple where contact is made with the transparent plate 53. This dimple provides point contact between the transparent plate 53 and springs 51, 52, 54 so as not to shatter the transparent plate 53. Also shown in this view are pins 61, 62 and pin 64 (not shown) which are individually positioned on the frame 55, each under the three springs 51, 52, 54, respectively. The purpose of these pins 61, 62, 64 will be discussed later.

Figure 5:
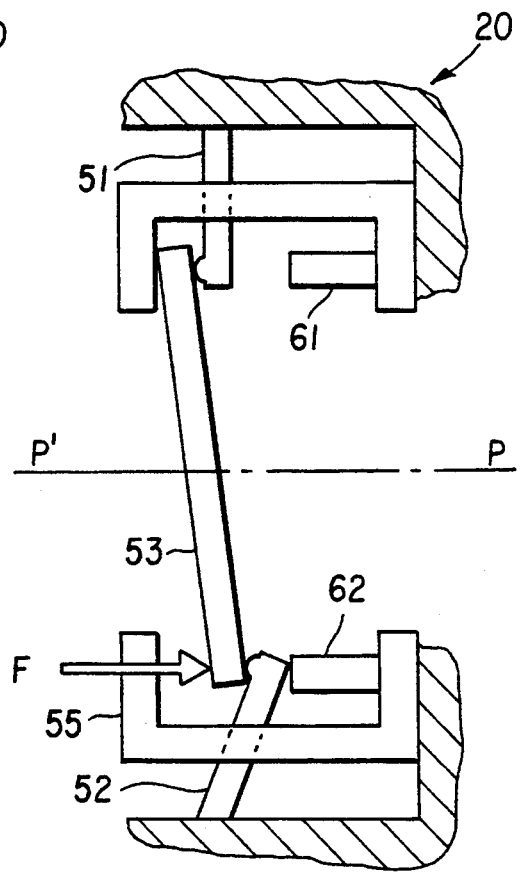
FIG. 5 shows a force exerted on the plate assembly shown in FIG. 4 to tilt the transparent plate.
Figure 6:
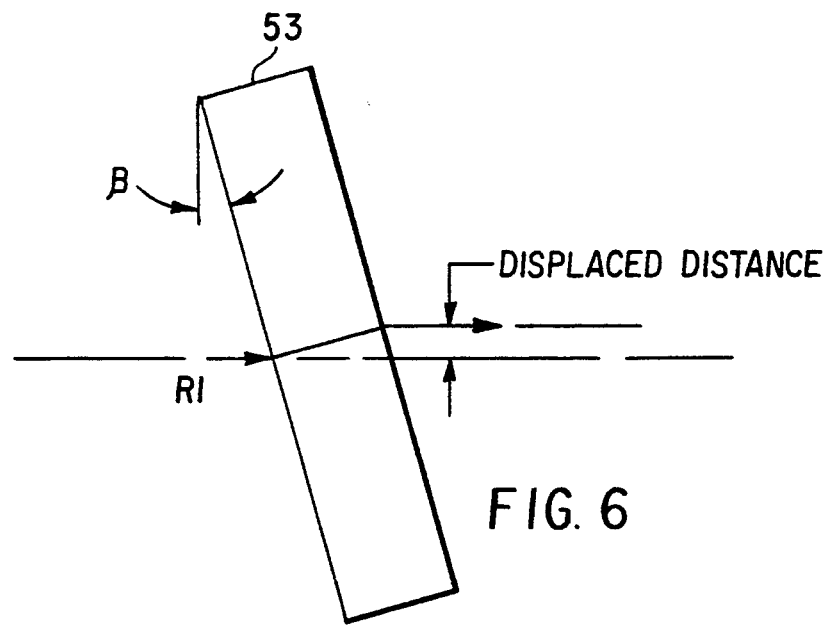
FIG. 6 shows the displacement of an image ray as it passes through a tilted transparent plate.

Note that the springs 51, 52, 54 prevent the transparent plate 53 from rotating about the optical axis P—P', but do not constrain the transparent plate 53 from being deflected. For example, FIG. 5 shows a Force F exerted at a corner of the transparent plate 53 just above spring 52. The Force F is large enough such that the transparent plate 53 and spring 52 are stopped from being deflected further by pin 62. Note that the transparent plate 53 is tilted at an angle. If the image beam B passes through the transparent plate 53 when the transparent plate 53 is tilted at such an angle, the image beam B will be displaced. Thus, the image 10 is shifted relative to the CCD 30. FIG. 6 shows how an incident ray R1 of the image beam B would be displaced when passing through the parallel optical surfaces of the transparent plate 53 tilted at an angle $\beta$. The ray R1 would be displaced a distance equal to a fraction of the pixel pitch D.

This orientation of the transparent plate 53 forms one of a plurality of orientations. The transparent plate 53 is tilted by applying a force F in at least one corner of the transparent plate 53. By applying the force F at varying corners, the transparent plate 53 can be tilted in different positions and thereby displace the image beam B in different directions. In the preferred embodiment, the transparent plate 53 has four different orientations so as to displace the image beam B in four different directions. At each orientation of the transparent plate 53, each pixel of the CCD 30 samples, i.e. captures, the image information. Therefore, in the preferred embodiment, there are four discrete sampling positions.

Figure 7:
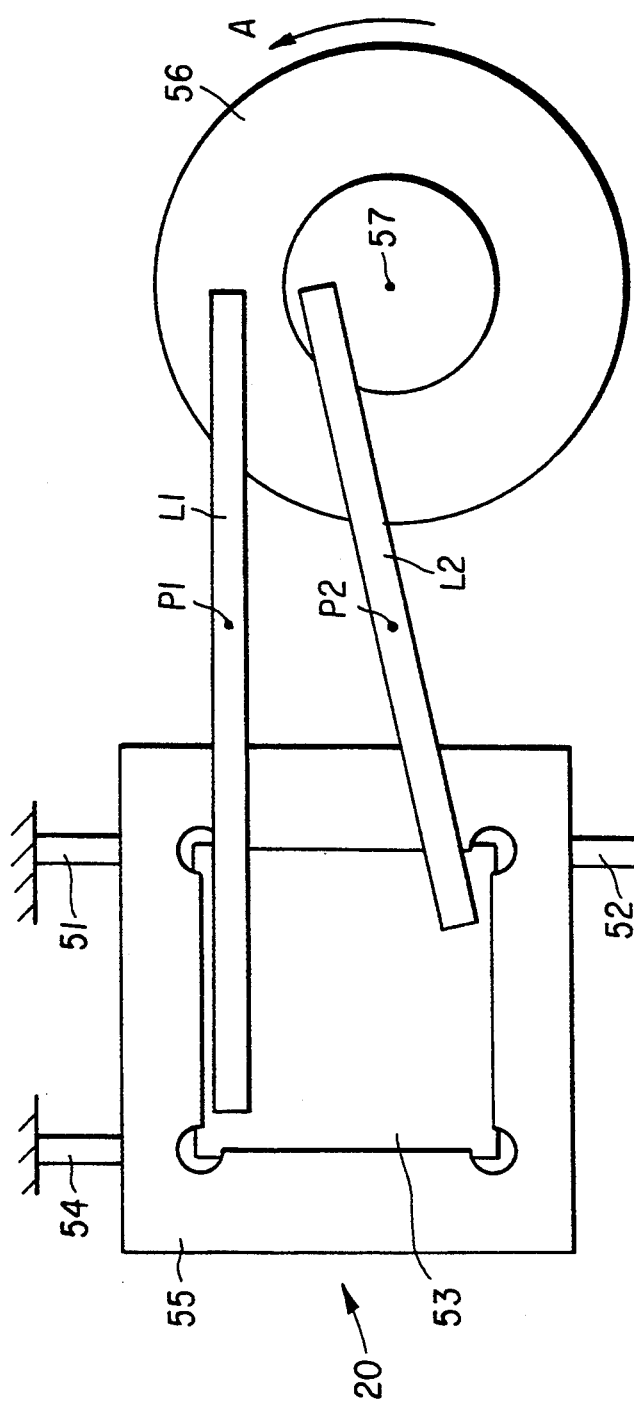
FIG. 7 shows the levers and cam positioned relative to the plate assembly shown in FIG. 3.

In the present invention, levers driven by a cam are used to apply the force F to the corners of the transparent plate 53. As shown in FIG. 7, in the preferred embodiment two levers L1 and L2 and a cam 56 are used to apply the force F. The first end of lever L1 is positioned over the corner of the transparent plate 53 above spring 54. The first end of lever L2 is positioned over the corner of the transparent plate 53 above spring 52. The second end of levers L1 and L2 contact cam 56. Pivot points P1 and P2 indicate the locations where levers L1 and L2, respectively, are secured to the frame 55. Cam 56 rotates, by means not shown, about an axis parallel to the optical axis P—P' centered at point 57 as illustrated by the arrow A in FIG. 7. As shown in FIG. 7, the levers L1, L2 are individual components. An alternate design, which would reduce the number of parts in the system, is to incorporate the two levers L1, L2 into one component.

Figure 8:
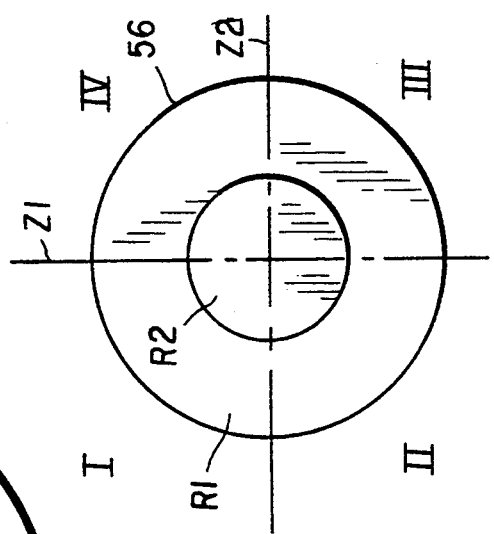
FIG. 8 identifies the surfaces of the cam shown in FIG. 7 which control the levers.

As shown in FIG. 8, in the preferred embodiment the cam 56 is circular in shape and comprises an outer ring R1 and an inner ring R2. The surface of the cam 56 on the outer ring R1 drives lever L1 while the surface of the cam 56 on the inner ring R2 drives lever L2. The cam 56 is partitioned into four quadrants I, II, III, and IV; each quadrant provides control to levers L1 and L2 to tilt the transparent plate 53 to the proper orientation to obtain the four discrete sampling positions. For descriptive purposes only, FIG. 8 shows lines Z1 and Z2 which visually partition the cam into the four quadrants I, II, III, and IV. During the operation of the plate assembly 20, the cam 56 rotates and the surfaces of the rings R1 and R2 control the movement of the levers L1 and L2. The surfaces of the cam 56 have two heights: low or high. As shown in FIG. 8, the shaded regions refer to the high height surfaces and the non-shaded regions refer to the low height surfaces. When the surface of the cam 56 is at the high height, the levers L1, L2 exert a force F on the transparent plate 53. When the surface of the cam 56 is at the low height, the levers L1, L2 do not exert a force F on the transparent plate 53. For example, in quadrant I both the inner ring R1 and outer ring R2 are at the low surface height. Therefore, neither lever L1 or L2 are in contact with the transparent plate 53 and the transparent plate 53 remains parallel to frame 55 as shown in FIG. 4. When the cam 56 rotates to quadrant II, the inner ring R2 changes to the higher height. When this happens, the second end of the lever L2, the end which contacts the cam 56, moves to this new elevated height. As a result, the first end of the lever L2 pivots about pivot point P2 (shown in FIG. 7) and lever L2 is pressed against the transparent plate 53, exerting a force F to tilt the transparent plate 53. (Refer back to FIG. 5.) When the cam 56 rotates further to quadrant III, the surface of the inner ring R2 remains at the higher height, but the surface of the outer ring R1 changes to the higher height. Now, lever L1 presses against the transparent plate 53 and tilts the transparent plate 53 to a different orientation. Note that at this position both levers L1 and L2 are pressing against the transparent plate 53. When the cam 56 rotates to quadrant IV, lever L2 no longer presses against the transparent plate 53 while lever L1 continues to tilt the transparent plate 53. Thus, four orientations of the transparent plate 53 are obtained by one complete revolution of the cam 56.

The low height of cam 56 is a height which does not cause the levers L1, L2 to contact the transparent plate 53. The high height of the cam 56 is the height needed to cause the lever L1, L2 to depress the transparent plate 53 and corresponding spring 51, 52, 54 against the corresponding pin 61, 62, 64. Note that the high height of the cam 53 could cause the lever L1, L2 and spring 51, 52, 54 to depress the transparent plate further than desired, however, the pin 61, 62, 64 is the mechanism which stops this from occurring. Yet too much compression on the transparent plate 53 by the levers L1, L2 could result in a failure in the system. If the pins 61, 62, 64 were not used in the system, then the high height of the cam 56 would be a critical dimension to ensure that the transparent plate 53 is tilted appropriately to obtain the desired displacement of the image beam B. An alternate design for the mechanical stops is to form the pins 61, 62, 64 as part of each spring 51, 52, 54, respectively. Then, as the spring 51, 52, 54 is depressed, the corresponding pin 61, 62, 64 would contact with the frame 55 and stop the transparent plate 53 from rotating further.

FIGS. 9A through 9D show a region of the image support 11 which corresponds to a quarter of the region of the CCD shown in FIG. 2. Each time the cam 56 rotates to a new quadrant I, II, III, IV, the transparent plate 53 is tilted to a different orientation. Thus, at each orientation, the image beam B is displaced in a different direction. For example, the cam surface of quadrant I does not cause the levers L1 and L2 to tilt the transparent plate 53. Therefore, at this reference orientation of the transparent plate 53, the image beam B is not displaced and directly impinges the CCD 30. The image 10 of the image support 11 impinged is shown by the shaded region in FIG. 9A. When the levers L1 and L2 are controlled by quadrant II of the cam 56, the transparent plate 53 is tilted so as to displace the image beam B in another direction. The corresponding area of the image support 11 impinged by the pixel 31 is shown by the shaded region in FIG. 9B. Likewise, quadrants III and IV of the cam 56 cause the image beam B to be displaced as shown by the shaded regions in FIGS. 9C and 9D, respectively.

Figure 9A:
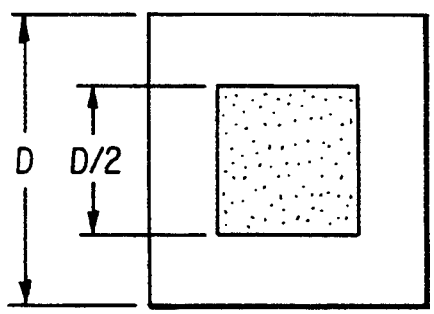
FIGS. 9A through 9D shows the movement of the image beam on a region of the image support which corresponds to a quarter of the region of the CCD shown in FIG. 2.
Figure 9B:
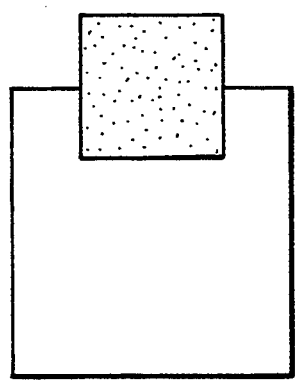
Figure 10:
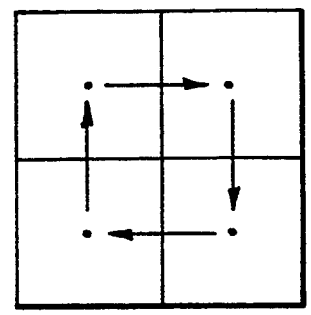
FIG. 10 identifies the closed rectangular trajectory of the image beam as it moves to the four discrete sampling positions as shown in FIGS. 9A-9D.

As shown in FIG. 10, if the path of the shaded regions from FIGS. 9A through 9D is followed, the image beam B shifts the image 10 relative to the CCD 30 along a closed rectangular trajectory. In the preferred embodiment, each time the image beam B is displaced, it is displaced by a distance D/2 from its previous position.

Figure 9C:
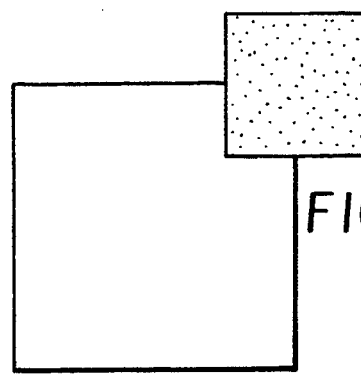
Figure 9D:
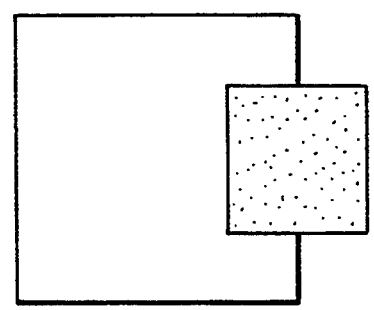

The angle $\beta$ of the transparent plate 53 as shown in FIG. 6 resulting in the distance D/2 for the orientations shown in FIGS. 9B and 9D can be calculated from the formula:

$$\frac{D}{2} = T\sin\beta \left(1 - \frac{\cos\beta}{\sqrt{N^2 - \sin^2\beta}}\right)$$

if the CCD 30 pixel pitch D, the index of refraction N of the transparent plate 53, and the thickness T of the transparent plate 53, are known. For example, in the preferred embodiment, the horizontal pixel pitch D of the CCD 30 is 9.0 microns and a displacement D/2 is 4.5 microns. Using a glass plate with an index of refraction N equal to 1.5 and a thickness T of 1.0 millimeters, the angle $\beta$ is approximately 0.775 degrees.

As mentioned previously, in the preferred embodiment each time the image beam is displaced, it is displaced by a distance D/2 from its previous position. To obtain the position shown in FIG. 9C, the orientation of the transparent plate 53 for FIG. 9B is tilted further so as to displace the image beam B by an additional distance D/2 along the closed rectangular trajectory. This additional displacement is obtained when lever L1 joins lever L2 in quadrant III in depressing the transparent plate 53. With both levers L1 and L2 depressing the transparent plate 53, the transparent plate 53 is tilted along its diagonal. The image beam B shown in FIG. 9C is a distance $$\frac{\sqrt{2} D}{2}$$

from the image beam B shown in FIG. 9A. The angle $\beta$ of the transparent plate 53 resulting in the distance $$\frac{\sqrt{2} D}{2}$$

for the orientation shown in FIGS. 9C can be calculated from the formula:

$$\frac{\sqrt{2} D}{2} = T\sin\beta \left(1 - \frac{\cos\beta}{\sqrt{N^2 - \sin^2\beta}}\right)$$

Note that the transparent plate 53 is a non-rotating component which is centered about the optical axis P—P'. The levers L1 and L2 are positioned so as to tilt the transparent plate 53 about the optical axis P—P'.

Since the image beam B is directed along the optical path P—P' before it is displaced, the image beam B intersects the transparent plate 53 at a substantially constant area of the transparent plate 53 for all of the sampling positions.

Precise control of the surface of the cam 56, the thickness of the transparent plate 53, and the cam orientation are less critical. The inventors have determined that an error in the system still produces an acceptable image. Furthermore, since the transparent plate 53 does not rotate, the apparatus is more "tolerant" of wedge error and other aberrations in the transparent plate 53. Note that the variation of the thickness of the transparent plate 53 is compensated by the changing travel of the transparent plate 53; that is, the variation in the thickness of the transparent plate 53 is inversely proportional to the travel of the transparent plate 53. For example, a thicker transparent plate 53 will travel less in the system when it is tilted, but a thicker transparent plate will displace the image beam B more. Conversely, a thinner transparent plate 53 will travel more in the system, but a thinner transparent plate 53 will displace the image beam B less.

To obtain the color information of the image, the color filter wheel 25 is rotated one revolution for each discrete sampling position. In the preferred embodiment, though two red filters 26, RED1 and RED2, are provided, only one of the two red filters 26 is used in conjunction with the BLUE and GREEN filters 26 to obtain the color information. (Refer to previously mentioned U.S. Pat. No. 4,922,333 by Nutting et al.) The operation of the invention is such that the transparent plate 53 is oriented in the first sampling position. The color filter wheel 25 rotates one revolution, stopping to allow three of the four filters 26 to be positioned in the path of the image beam B. For example, the color filter wheel 25 is rotated and the GREEN filter is placed in the path of the image beam B. The CCD 30 captures the green image and stores it in the framestore 40. The color filter wheel 25 is advanced to place the BLUE, RED1 or RED2 filters 26 in the imaging path. For each filter 26, the image is stored in the framestore 40. When the red, green, and blue information has been stored, the transparent plate 53 is oriented in the second sampling position. Once again, the color filter wheel 25 rotates one revolution, stopping to allow three of the four filters 26 to be positioned in the path of the image beam B and allowing the image to be captured by the CCD 30. This process is repeated for the third and fourth sampling positions. As mentioned previously, the electrical output signals are then processed to produce a RED, GREEN, and BLUE signal on three separate channels. These signals may then be used to recreate the image on a color viewing screen or on a hard copy print. If monochrome information is to be obtained, only the GREEN filter 26 of the color filter wheel 25 is used.

An alternative technique to process the electrical output signals is to interleave the discrete sampling position information with the corresponding red, green, blue information on a host computer system. This technique would provide for a reduced cost and simpler image sampling system. An alternate method of operation of the image sampling system is to position the transparent plate 53 in the four discrete sampling positions each time one color filter 26 is positioned in the path of the image beam B.

Although the color filter wheel 25 is shown positioned between the optical lens system 15 and the CCD 30, it is possible to position the color filter wheel 25 elsewhere. For example, the color filter wheel 25 can be positioned between the image support 11 and the optical lens system 15. Similarly, the plate assembly 20 is shown positioned between the optical lens system 15 and the CCD 30. It likewise can be positioned elsewhere in the path of the image beam B, for example, between the image support 11 and the optical lens system 15. Further, the image does not need to be a transparent image. If the image is not transparent, the light source would be used to illuminate the non-transparent image.

The invention has been described in detail with particular reference to a presently preferred embodiment, but it will be understood that variations and modifications can be effected within the spirit and scope of the invention. For example, though the invention describes the use of a single lever and cam system to control the placement of the image beam B, it is understood that a plurality of lever and cam systems could be used for such control.

What is claimed is:

1. An optical imaging apparatus for increasing the resolution of an image comprising:
   a source of light;
   means for positioning an image-bearing support in the path of the light so as to generate an image beam directed along an optical axis;
   an image sensor positioned in the path of the image beam having active areas separated by inactive interstices between the active areas;
   a single optical member comprising a transparent plate made of optical glass with parallel optical surfaces interposed in the path of the image beam for controlling the placement of the image beam on said image sensor;
   a cam laterally displaced from the path of the image beam and adapted for rotary motion about an axis parallel to the optical axis: and
   a lever interposed between said cam and said single optical member said lever contacting one of said parallel optical surfaces of said transparent plate, said cam mechanically actuating said lever to tilt said single optical member, without causing rotation of said single optical member about the optical axis, to displace the image beam through a plurality of discrete positions along a closed trajectory, whereby different portions of the image beam impinge upon the active areas of said image sensor.

2. An apparatus according to claim 1, in which said plurality of discrete positions is displaced along a closed rectangular trajectory.

3. An apparatus according to claim 1, in which said single optical member is tilted about said optical axis of said image beam.

4. An optical imaging apparatus for increasing the resolution of an image comprising:
   a source of light;
   means for positioning an image-beating support in the path of the light so as to generate an image beam directed along an optical axis;
   an image sensor positioned in the path of the image beam having active areas separated by inactive interstices between the active areas;
   a single optical member comprising a transparent plate made of optical glass with parallel optical surfaces interposed in the path of the image beam for controlling the placement of the image beam on said image sensor; and a lever and means for actuating said lever for tilting said single optical member in a plurality of directions, without causing rotation of said single optical member about the optical axis, to displace the image beam through a plurality of discrete positions along a closed rectangular trajectory, whereby different portions of the image beam impinge upon the active areas of said image sensor, said means for actuating said lever comprising a cam with an inner surface ring and an outer surface ring, said inner and outer surface rings used for controlling the motion of said lever.

5. An apparatus according to claim 4, in which said single optical member is tilted about said optical axis of said image beam when said lever actuates.

6. An apparatus according to claim 4, in which said lever is in contact with said single optical member for controlling the tilting of said single optical member.

7. An apparatus according to claim 4, in which said image-bearing support is transparent.

8. An apparatus according to claim 4, in which said image-bearing support is non-transparent.

9. An apparatus according to claim 4, further comprising color filtering means for providing a sequential insertion of a plurality of color filters in the optical path of the image beam.

* * * * *